A. MAYER.
APPARATUS FOR CUTTING SCREWS ON PIPES AND OTHER ARTICLES.
No. 9,537. Patented Jan. 11, 1853.

UNITED STATES PATENT OFFICE.

ANDREW MAYER, OF PHILADELPHIA, PENNSYLVANIA.

ARRANGEMENT OF SCREW-CUTTING DIES.

Specification of Letters Patent No. 9,537, dated January 11, 1853.

*To all whom it may concern:*

Be it known that I, ANDREW MAYER, of the city and county of Philadelphia and State of Pennsylvania, have invented a new and useful Improvement in Apparatus for Cutting Screws on Pipes and other Articles; and I do hereby declare that the following is a full, clear, and exact description of the same, reference being had to the accompanying drawings, forming part of this specification, in which—

Figure 1:
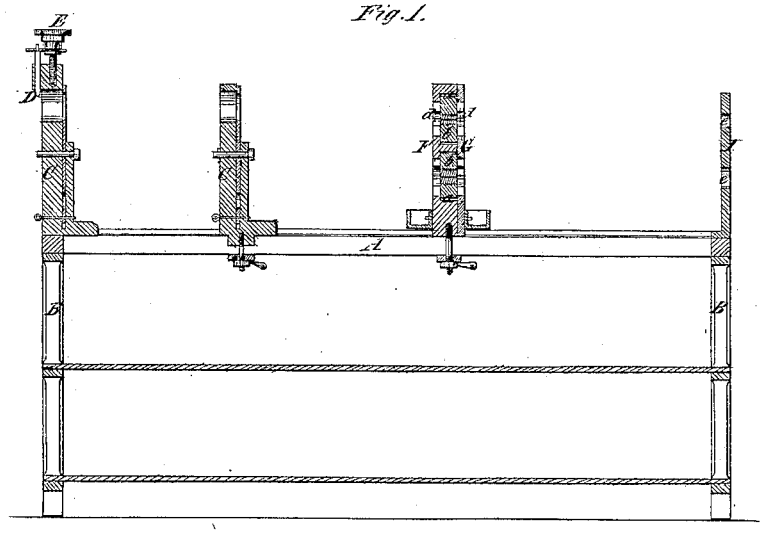
Figures 2, 3:
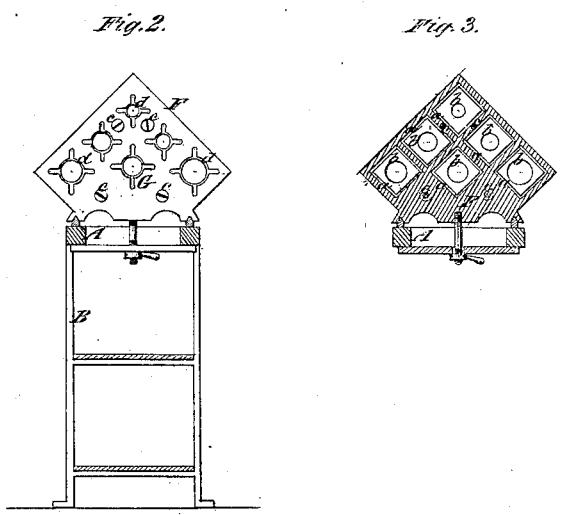

Figure 1, is a longitudinal vertical section of a pipe lathe for turning the ends and cutting screws on gas piping. Fig. 2, is a transverse vertical section of the same showing the front of the die stock. Fig. 3, is a transverse section of the die stock.

Similar letters of reference indicate corresponding parts in each of the several figures.

The nature of this invention consists in fitting and securing solid dies between the two side plates or their equivalents of a stock in such a manner that their turning and motion endwise or in the direction of the axis of the screw is prevented but that a certain amount of movement laterally, or transversely to the axis is allowed. The reason for allowing this movement is to enable the dies to accommodate themselves as the pipe or other article is turned to screw it, to any bends or irregularities which may occur in it, and which if the dies are fixed, cause it to jam and render it more difficult to turn, and prevent the screw being truly cut.

To enable others skilled in the art to make and use my invention, I will proceed to describe its construction and operation.

A represents the bed of the lathe which is supported by standards B, B.

C, C, are the collar plate stocks in which the pipe is supported to turn the ends for screwing.

D, is the turning tool worked by a screw E, attached to one of the stocks C.

F, is the die stock which is secured to the lathe bed A, in the ordinary manner and is movable for screwing different lengths of pipe; on its front side there are a sufficient number of recesses $a$, $a$, to receive the dies $b$, $b$, necessary for the different sizes of pipes; these recesses are of sufficient depth to receive the dies, which are confined in them by a plate G, which covers the face of the stock and is secured to it by screw bolts $c$, $c$. The dies and recesses are of similar form, but the recesses are larger than the dies to admit of transverse play in all directions, but yet not sufficiently large to allow the dies to turn. The dies are not so tightly confined lengthwise but that they will move laterally with ease. There are holes $d$, $d$, in the back of the die stock and in the covering plate G, large enough to allow the pipe to pass through and to admit of the necessary lateral play.

I, is the guide plate having a number of holes $e$, $e$, (see Fig. 1) corresponding in size and position to the dies, for the purpose of guiding the pipe to the dies. The pipe is turned in the dies by a ratchet brace or other convenient contrivance such as is commonly used for the purpose and the process of screwing is conducted in the usual manner. The dies find their proper position in the recesses $a$, $a$, in which if the pipe is perfectly straight and true, they will remain stationary but if the latter is crooked they move as the pipe turns, always keeping true to it. A great saving in the wear of the dies is effected by the prevention of jamming and straining which has the effect of breaking the threads.

What I claim as my invention and desire to secure by Letters Patent, is—

Arranging solid dies between the side plates, or their equivalents, of a stock in such a manner that they are free to play to a limited distance in a plane perpendicular to the axis of the bolt, or pipe to be screwed, while they are at the same time incapable of revolution in the same plane substantially in the manner and for the purposes described.

ANDREW MAYER.

Witnesses:
C. ISAID,
WILLIAM MACDONALD.